(12) United States Patent
Yang et al.

(10) Patent No.: US 6,401,124 B1
(45) Date of Patent: Jun. 4, 2002

(54) NETWORK PERIPHERAL SHARING SYSTEM

(75) Inventors: Che-Chu Yang, Chang Hua Hsien; Jeun-Tsair Tsai, Taipei Hsien, both of (TW)

(73) Assignee: Mustek Systems Inc., Hsin-Chu (TW)

( * ) Notice: Subject to any disclaimer, the term of this patent is extended or adjusted under 35 U.S.C. 154(b) by 0 days.

(21) Appl. No.: 09/231,710

(22) Filed: Jan. 13, 1999

(51) Int. Cl.⁷ .............................................. G06F 15/16
(52) U.S. Cl. ..................... 709/228; 709/223; 710/17; 710/19
(58) Field of Search ................................ 709/227, 223, 709/224, 203, 208, 209, 211, 244, 249, 300, 301, 302, 202, 228; 710/8, 15, 17, 18, 19, 16

(56) References Cited

U.S. PATENT DOCUMENTS

| | | | |
|---|---|---|---|
| 5,687,320 A | * 11/1997 | Wiley et al. ................... 710/17 |
| 5,862,404 A | * 1/1999 | Onaga ......................... 709/223 |
| 5,901,286 A | * 5/1999 | Danknick et al. ............. 709/203 |
| 5,928,335 A | * 7/1999 | Morita ......................... 709/303 |
| 5,968,138 A | * 10/1999 | Clough .......................... 710/8 |
| 6,067,558 A | * 5/2000 | Wendt et al. ................ 709/202 |
| 6,085,246 A | * 7/2000 | Brandt et al. ............... 709/228 |
| 6,101,528 A | * 8/2000 | Butt ............................ 709/203 |
| 6,101,555 A | * 8/2000 | Goshey et al. ............... 709/301 |

* cited by examiner

Primary Examiner—Mark H. Rinehart
Assistant Examiner—Marc D. Thompson
(74) Attorney, Agent, or Firm—Winston Hsu

(57) ABSTRACT

The present invention provides a network peripheral sharing system comprising a computer network, at least one client computer connected to the computer network, at least one server computer connected to the computer network, and a network address table containing network addresses of server computers connected to the computer network. Each client computer has a peripheral searching program that searches peripherals connected to the computer network and each server computer has at least one connected peripheral. The peripheral serving program in the server computer provides information on the status of peripherals to the client computer and transmits the status message of the peripheral to the client computer after receiving a request from the user thus establishing a link between the client computer and the peripheral. The peripheral searching program in the client computer emits a search request based on network addresses contained in the network address table to search the available peripherals of the server computer. The computer network, or internet, may further comprise sub-networks wherein client computers send search requests to the sub-network to search the peripheral connected to a server computer within the sub-network.

7 Claims, 2 Drawing Sheets

| Server computer 1 | Network address 1 | \<Peripheral 1: digital camera\>\<Peripheral 2:scanner\>· · · · · · |
|---|---|---|
| Server computer 2 | Network address 2 | \<Peripheral 1: high-grade scanner\>\<Peripheral 2: digieal camera\>· · · · · · |
| Server computer 3 | Network address 3 | \<Peripheral 1: digital camera\> |
| · · · · · · · · | · · · · · · · · | · · · · · · · · · · |

Fig.2

NETWORK PERIPHERAL SHARING SYSTEM

BACKGROUND OF THE INVENTION

1. Field of the Invention

The invention relates to a network peripheral sharing system, and more specifically, to a network peripheral sharing system to enable the sharing of peripherals on a network.

2. Description of the Prior Art

Generally, only one peripheral is connected to one computer as in the case of one scanner being connected to one computer. If the user wants to use the scanner on another computer, he must physically move the scanner and reconnect with another computer. This cumbersome process is made even more difficult if a high-grade scanner is used which may weigh in excess of ten kilograms. Since only one computer can use the scanner at any one time, the added inconvenience will deter users from using the scanner.

SUMMARY OF THE INVENTION

It is therefore a primary objective of the present invention to provide a network peripheral sharing system to enable the sharing of peripherals on a network.

Briefly, in a preferred embodiment, the present invention provides a network peripheral sharing system comprising:

a computer network for transmitting information;

at least one client computer connected to the computer network for transmitting and receiving information, each client computer having a peripheral searching program executed in it for searching peripherals connected to the computer network; and at least one server computer connected to the computer network for transmitting and receiving information, each server computer having at least one peripheral connected to it and one peripheral serving program executed in it for providing a status message of each connected peripheral to a client computer and for establishing a communication link between a client computer and one peripheral connected to the server computer;

wherein a user can send a search request to search an available peripheral connected to one server computer by using the peripheral searching program of a client computer, and the peripheral serving program of each server computer will transmit the status message of the connected peripheral to the client computer after receiving the search request, and the peripheral searching program of the client computer can establish a communication link between the client computer and the peripheral of the server computer through the peripheral serving program of the server computer.

It is an advantage of the present invention that users can conveniently use each peripheral without moving and reconnecting it every time thereby encouraging its use.

These and other objects and the advantages of the present invention will no doubt become obvious to those of ordinary skill in the art after having read the following detailed description of the preferred embodiment that is illustrated in the various figures and drawings.

BRIEF DESCRIPTION OF THE DRAWINGS

FIG. 2 shows a network address table of a client computer.

DETAILED DESCRIPTION OF THE PREFERRED EMBODIMENT

Figure 1:
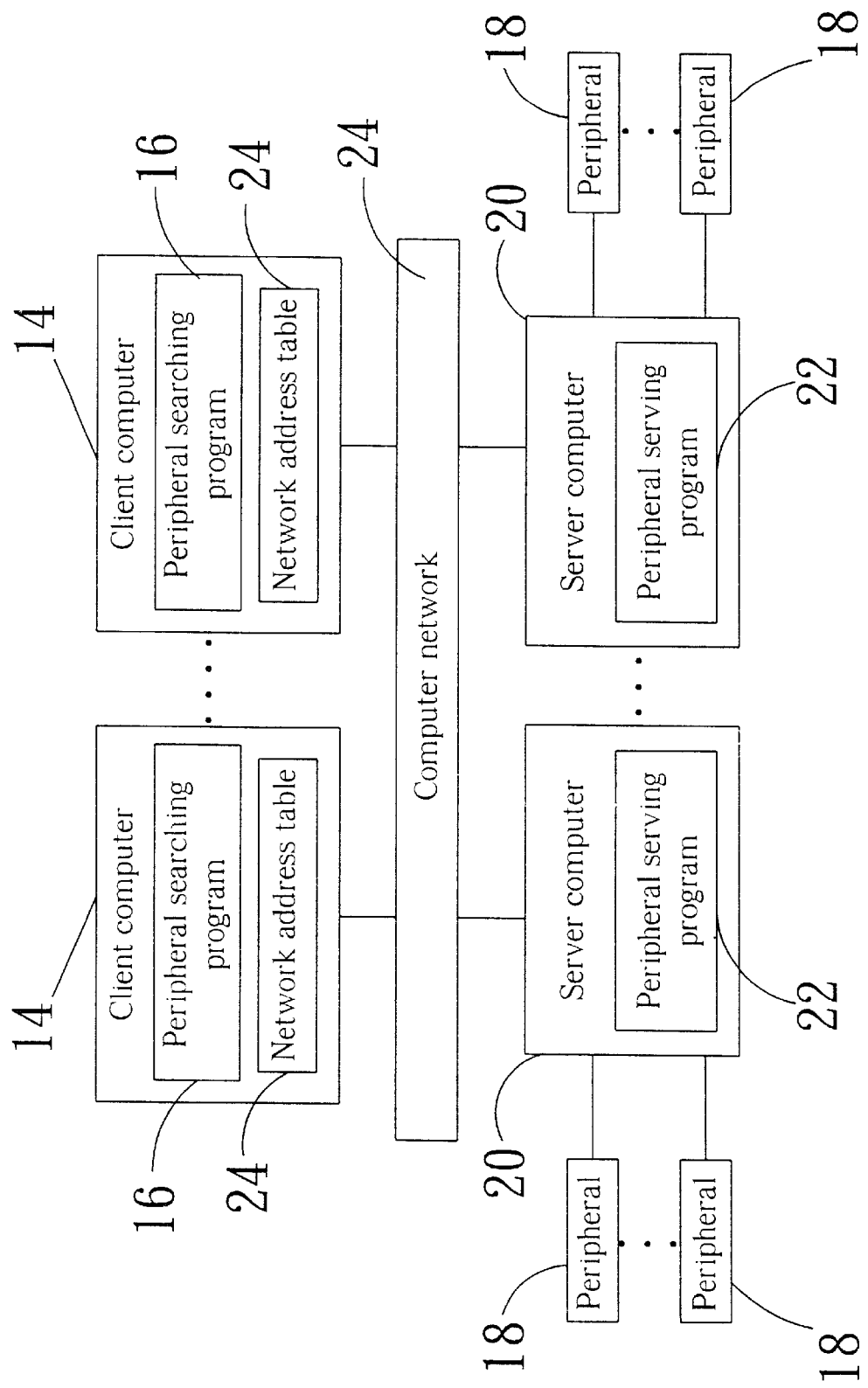
FIG. 1 is a perspective diagram of a network peripheral sharing system according to the present invention.

Please refer to FIG. 1. FIG. 1 is a perspective diagram of a network peripheral sharing system 10 according to the present invention. The network peripheral sharing system 10 is used for sharing peripherals 18 and comprises a computer network 12 for transmitting information, a plurality of client computers 14 connected to the computer network 12 and a plurality of server computers 20 connected to the computer network 12. Each client computer 14 has a peripheral searching program 16 for searching peripherals 18 connected to the computer network 12. Each server computer 20 has at least one peripheral 18 and one peripheral serving program 22. The peripheral serving program 22 is used for providing the status message of each peripheral 18 connected to the client computer 14 and computer network 12 and for establishing a communication link between a client computer 14 and the peripheral 18 connected to the server computer 20.

The peripheral 18 of the server computer 20 can be a scanner, digital camera, or other peripheral. One server computer 20 can have a plurality of peripherals 18, and the peripheral serving program 22 of the server computer 20 can both connect a plurality of peripherals 18 with other client computers 14 and prepare for receiving request messages.

The computer network 12 can be the internet, a local area network, an intranet or other computer network. The computer network 12 can have a plurality of sub-networks, and the peripheral searching program 16 of each client computer 14 sends its search request to a particular sub-network by broadcasting to search an available peripheral 18 connected to one server computer 20 within the sub-network.

Please refer to FIG. 2. FIG. 2 shows a network address table 24 of a client computer 14. The client computer 14 can send a search request to the server computer 20 by using a network address table 24. The network address table 24 has a plurality of data records, and each data record comprises a server computer identification 30, network address 32 and identification data 34 of each peripheral 18. Each identification data 34 has data on peripheral ID and type.

After the client computer 14 sends its search request to a particular sub-network by broadcasting, the status message of each peripheral 18 transmitted from the server computers 20 in the sub-network is stored in the network address table 24. By using the network address table 24, the peripheral 18 can be searched without broadcasting or searching from each of the server computers 20.

When using one peripheral 18, the user determines one peripheral type by using the identification data 34 in the network address table 24 and obtains the status message of each chosen peripheral 18 by using the server computer identification 30 and network address 32 of each chosen server computer 20. When the chosen peripheral 18 is ready, the peripheral searching program 16 locks the peripheral 18 by sending a lock message to the server computer 20. If the server computer 20 agrees to the locking of the peripheral 18, the peripheral serving program 22 changes the status of the peripheral 18 to a locked status while simultaneously establishing a communication link between the client computer 14 and the peripheral 18 for transmission of information.

When the client computer 14 sends a search request to a particular sub-network by broadcasting, the request may include a peripheral requirement data. The peripheral serving program 22 receives the request and sends the status message of the peripheral 18 to the client computer 14 after verifying that the peripheral 18 matches the peripheral requirement data.

The network peripheral sharing system 10 according to the present invention makes each client computer 14 search the available peripheral 18 by using the peripheral searching program 16 and establishes a communication link between the client computer 14 and the peripheral 18 through the peripheral serving program 22 of the server computer 20. Therefore, users can conveniently use each peripheral 18 without moving and reconnecting the peripheral 18 thus encouraging its use.

Those skilled in the art will readily observe that numerous modifications and alterations of the propeller may be made while retaining the teachings of the invention. Accordingly, the above disclosure should be construed as limited only by the metes and bounds of the appended claims.

What is claimed is:

1. A network peripheral sharing system comprising:

a computer network for transmitting information;

at least one client computer connected to the computer network for transmitting and receiving information, each client computer having a peripheral searching program executed in it for searching peripherals connected to the computer network; and at least one server computer connected to the computer network for transmitting and receiving information, each server computer having at least one peripheral connected to it and one peripheral serving program executed in it for providing a status message of each connected peripheral to a client computer, handling requests to change the status message of a peripheral, changing a status message of a peripheral to locked, and establishing a communication link between a client computer and one peripheral connected to the server computer;

wherein a user can send a search request to search an available peripheral connected to one server computer by using the peripheral searching program of a client computer, and the peripheral serving program of each server computer will transmit the status message of the connected peripheral to the client computer after receiving the search request, and the peripheral searching program of the client computer can establish a communication link between the client computer and the peripheral of the server computer through the peripheral serving program of the server computer.

2. The network peripheral sharing system of claim 1 wherein the computer network comprises a plurality of sub-networks, and the peripheral searching program of each client computer can send its search request to a particular sub-network to search an available peripheral connected to one server computer within the sub-network.

3. The network peripheral sharing system of claim 2 wherein the computer network is the internet.

4. The network peripheral sharing system of claim 1 wherein the client computer has a network address table having a plurality of network addresses, each network address corresponding to a server computer connected to the computer network; and the peripheral searching program of the client computer sends a search request to the server computer corresponding to each network address contained in the network address table to search the available peripherals of the server computer.

5. The network peripheral sharing system of claim 1 wherein the request sent by the client computer includes a peripheral requirement data, and each peripheral serving program receives the request and sends the status message of the peripheral to the client computer after verifying that the peripheral matches the peripheral requirement data.

6. The network peripheral sharing system of claim 1 wherein the peripheral of the server computer is a scanner.

7. The network peripheral sharing system of claim 1 wherein the server computer can have a plurality of scanners, and the peripheral serving program of the server computer can connect the scanners to other client computers at the same time.

* * * * *